No. 865,151. PATENTED SEPT. 3, 1907.
W. K. ANDREW.
FORCE PUMP.
APPLICATION FILED MAY 13, 1907.
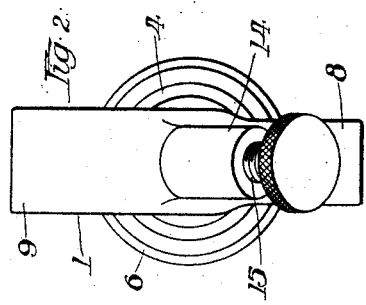
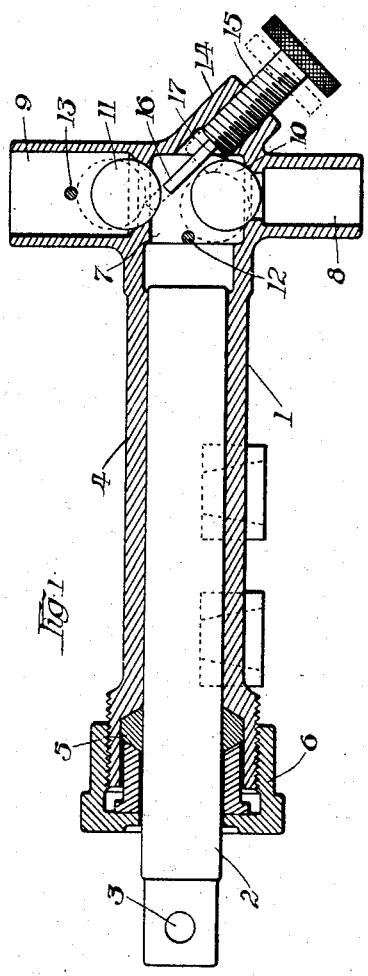
Witnesses:
F. W. Hoffmeister.
J. N. Daggett.
Inventor
William K. Andrew
By E. W. Burgess
Attorney

UNITED STATES PATENT OFFICE.

WILLIAM K. ANDREW, OF MILWAUKEE, WISCONSIN, ASSIGNOR TO INTERNATIONAL HARVESTER COMPANY, A CORPORATION OF NEW JERSEY.

FORCE-PUMP.

No. 865,151.  Specification of Letters Patent.  Patented Sept. 3, 1907.

Application filed May 13, 1907. Serial No. 373,288.

*To all whom it may concern:*

Be it known that I, WILLIAM K. ANDREW, a citizen of the United States, residing at Milwaukee, in the county of Milwaukee and State of Wisconsin, have invented certain new and useful Improvements in Force-Pumps, of which the following is a specification.

My invention relates to force pumps in general, and particularly to such devices when used in connection with the water circulating system of explosive engines; its object being to provide a mechanism both simple and serviceable in its operation as a force pump, and means for readily draining the fluid from the delivery pipes and other accessories when desirable. I attain these objects by the mechanism illustrated in the accompanying drawings, in which—

Figure 1 is a sectional plan view of the mechanism; and Fig. 2 is an end elevation of Fig. 1.

Similar reference numerals designate like parts throughout the several views.

1 represents the pump cylinder; 2 a piston operative therein, having an opening 3 without the cylinder by which it may be connected with an operative part of an explosive engine or other mechanism. 4 represents a gland surrounding the piston, and movable against a packing ring 5 by means of the adjustable cap piece 6 screwed upon the outer end of the stuffing box, all of said parts being constructed in any preferred form. At the opposite end of the cylinder is a valve chamber 7 having an inlet pipe 8 and an outlet pipe 9 communicating therewith, the two pipes being preferably in line with each other; and 10 and 11 represent ball valves suitably seated at the delivery and receiving ends of said inlet and outlet pipes, respectively, in a manner to control the movement of fluid therethrough, and cross pins 12 and 13 are inserted through the walls of the pipes in a manner to limit the lift of the valves.

14 represents a stem arranged at an angle with the inlet and outlet pipes and having an axial opening, in which is screwed a plug 15, said plug having a reduced inner end 16 and a shoulder portion 17, the function of the plug being to move the valves from their seats by means of its shoulder portion contacting with valve 10, and its reduced inner end with valve 11, when it is adjusted inward as shown by dotted lines in Fig. 1.

The pump is designed to operate in connection with an explosive engine for the purpose of causing a circulation of water for cooling purposes, and if for any reason it be desired to drain the water from the cooling chambers and conducting pipes, it may be readily accomplished by screwing the plug inward, which operation lifts the valves from their seats and permits the water to flow backward through the pipes.

What I claim as my invention, and desire to secure by Letters Patent, is:

1. A force pump having, in combination, a cylinder, a piston operative therein, inlet and outlet pipes communicating therewith, valves controlling the flow of fluid through said pipes, and single means comprising a movable plug adapted to contact with said valves in a manner to lift them from their seats.

2. A force pump having, in combination, a cylinder, a piston operative therein, inlet and outlet pipes communicating therewith, valves controlling the flow of fluid through said pipes, and means comprising a movable plug having a shoulder portion adapted to contact with one of said valves, and a reduced end portion with the other in a manner to lift them from their seats.

3. A force pump having, in combination, a cylinder, a piston operative therein, inlet and outlet pipes communicating therewith, valves controlling the flow of fluid through said pipes, means comprising a movable plug adapted to contact with said valves in a manner to lift them from their seats, and cross pins through said pipes, said pins adapted to limit the opening movement of said valves.

4. A force pump having, in combination, a cylinder, a piston operative therein, inlet and outlet pipes communicating therewith and extending laterally in opposite directions therefrom, valves controlling the flow of fluid through said pipes, a threaded opening communicating with the interior of said cylinder and arranged at an angle with said pipes, a threaded plug received by said opening and having a reduced inner end engaging with one of said valves, and a shoulder portion with the other, said plug being operative to lift the valves from their seats when adjusted in one direction.

WILLIAM K. ANDREW.

Witnesses:
B. C. WAIT,
W. J. CARNEY.